(12) United States Patent
Houghtaling et al.

(10) Patent No.: US 7,201,949 B2
(45) Date of Patent: Apr. 10, 2007

(54) OPTICAL FILM FOR DISPLAY DEVICES

(75) Inventors: Bradley M. Houghtaling, Rochester, NY (US); Mridula Nair, Penfield, NY (US); Yuanqiao Rao, Pittsford, NY (US); Tamara K. Jones, Rochester, NY (US); Robert J. Kress, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 262 days.

(21) Appl. No.: 10/690,123

(22) Filed: Oct. 21, 2003

(65) Prior Publication Data

US 2005/0084622 A1 Apr. 21, 2005

(51) Int. Cl.
- B32B 27/30 (2006.01)
- B32B 27/36 (2006.01)
- B32B 27/40 (2006.01)
- C08F 2/46 (2006.01)
- C08F 2/48 (2006.01)

(52) U.S. Cl. ........................ 428/1.1; 428/323; 428/413; 428/480; 428/423.1; 428/522; 427/487

(58) Field of Classification Search .................... None
See application file for complete search history.

(56) References Cited

U.S. PATENT DOCUMENTS

| | | | |
|---|---|---|---|
| 5,599,649 A * | 2/1997 | Shinkai et al. | 430/270.11 |
| 6,008,940 A * | 12/1999 | Michihata et al. | 359/483 |
| 6,060,183 A | 5/2000 | Higashi et al. | |
| 6,164,785 A | 12/2000 | Maekawa | |
| 6,572,961 B1 * | 6/2003 | Koyama et al. | 428/323 |
| 6,773,121 B2 * | 8/2004 | Miyatake et al. | 359/601 |
| 6,832,037 B2 * | 12/2004 | Aylward et al. | 385/145 |
| 2002/0019461 A1 | 2/2002 | Yashiro et al. | |

OTHER PUBLICATIONS

M. Nair et al, "Optical Film for Display Devices", U.S. Appl. No. 10/292,353 (D-84417) filed Nov. 12, 2002.

* cited by examiner

*Primary Examiner*—Monique R. Jackson
(74) *Attorney, Agent, or Firm*—Arthur E. Kluegel

(57) ABSTRACT

Disclosed is an optical film comprising a layer containing layered clay particles in a radiation cured binder. Also disclosed is a coating dispersion and a method of forming an optical film comprising coating the dispersion on a flexible transparent polymeric support and an LCD or touch screen display incorporating the film.

30 Claims, No Drawings

OPTICAL FILM FOR DISPLAY DEVICES

FIELD OF THE INVENTION

This invention relates to an optical film for use in high definition image display devices such as LCD and CRT panels for imparting excellent antiglare properties.

BACKGROUND OF THE INVENTION

LCDs and CRTs are widely employed in a variety of typical display devices such as television sets, computer terminals and the like. A key problem is improving the quality of the display devices in keeping with the trend for increased image resolution. With the advent of multimedia including, in particular, a variety of portable terminals of communication systems represented by mobile telephones and the like, innovative display systems are expected to play a very important role in the interface between man and machine. U.S. Pat. No. 5,914,073 suggests an adhesively applied laminate of a clear resin overcoated with a polyol acrylate resin that is UV cured. U.S. Pat. No. 6,329,041 suggests a three layer hard coating with a middle buffer layer overcoated with an antireflection coating. U.S. Pat. No. 6,376,060 suggest including an inorganic filler in a hardcoat film.

LCDs play a big role in this market of portable terminals since they are light in weight and can be made compact along with their versatility for many types of displays. Since these portable terminals are frequently used outdoors, it is important to ensure good visibility of their images even in bright sunlight by suppressing glare or specular reflection as completely as possible. In order to ensure this, an antiglare film is preferably provided on the surface of the display for diffusing external light and suppressing specular reflection.

U.S. Pat. No. 5,998,013 discloses an antiglare film formed by coating a resin, containing fillers such as agglomerated silicon dioxide, onto the surface of a transparent substrate film. Another method of achieving the same is by texturing or roughening the surface of the substrate. For example, the surface of a substrate can be directly roughened by sandblasting, or embossing or the like, or by employing a method in which a porous film is formed on the surface of the substrate.

U.S. Pat. No. 6,008,940, describes a glare-proof layer comprising a resin with coarse and fine particles and a refractive index of 1.4–1.6. The fine particles are hydrophilic and have moisture contents of greater than 0.5 percent. U.S. Pat. No. 6,217,176 describes an antiglare film comprising a resin containing two types of light-transparent fine particles to control the index of refraction of the layer. U.S. Pat. No. 6,074,741 describes an antiglare material comprising a roughened surface layer derived from an ultraviolet curable resin containing an epoxy compound and a photo cationic polymerization initiator and two different populations of resin beads. U.S. Pat. No. 6,347,871 describes an antiglare layer comprising two resin-coated layers wherein the top layer contains particles smaller in size than those in the bottom layer. U.S. Pat. No. 6,343,865 relates to a non-glare film onto which a low refractive index film is laminated resulting in suppressed degradation of contrast and whitening.

The prior art primarily teaches the use of symmetric spherical particles. Spherical symmetric polymer particles can provide the desired antiglare properties, but their highly curved surfaces can potentially disadvantage the system. When abraded, such spherical particles have a tendency to come off from the coating due to poor adhesion at the particle/binder interface. This leads to dusting and microscopic pitting of the surface resulting in increased transmission haze and reduced image contrast and sharpness. Additionally, when antiglare coatings are coated on flexible substrates such as cellulose triacetate, adhesion to the substrate becomes increasingly important in light of the fact that such flexible substrates are often handled in wound roll form.

It is well known in the industry to use aggregated silica particles in coatings to provide antiglare properties. While these particles provide controlled haze and gloss, they can contribute to cinch abrasion in such wound rolls of flexible substrates.

In spite of the teachings in the arena of antiglare screens, there exists a continuing need for developing a robust display screen for the reasons discussed above with either antiglare characteristics which prevent specular reflection of external light from sources such as the sun, fluorescent lamps and the like on them since the antiglare film is coated on the outermost surface of the polarizer in the LCD. In particular, it is desirable to have an antiglare optical film that exhibits both a desirable gloss and haze level.

SUMMARY OF THE INVENTION

The invention provides an optical film comprising a layer containing layered clay particles in a radiation-cured binder. The invention further provides a useful dispersion, a process for making the film, and an LCD or touch screen display incorporating the film.

The invention provides materials that both a desirable gloss and haze level.

DETAILED DESCRIPTION OF THE INVENTION

The invention is generally described above.

The term "low molecular weight" means a weight average molecular weight less than 10,000. Typically, the compounds will have a weight average molecular weight less than 5,000. The present invention provides an optical film containing an antiglare layer for use in high definition image display devices such as LCD or CRT panels for imparting excellent antiglare properties, abrasion, chemical and handling resistance, and a method for producing the same. In accordance with the present invention, the antiglare layer of the present invention is derived from actinic radiation curable dispersions of oligomers or monomers containing layered clay particles coated onto a flexible transparent support such that it provides advantageous properties such as good film formation, excellent antiglare properties, low haze, good fingerprint resistance, abrasion resistance, toughness, hardness, good chemical resistance and durability. Examples of actinic radiation include ultraviolet (UV) radiation and electronic beam radiation. Of these UV is preferred.

The inventors have discovered that the use of layered clay particles in a radiation cured optical film yielded a desirable lower haze penalty than the comparative examples at the same level of gloss. A second unexpected result showed that many embodiments of the invention achieved similar haze and gloss values even at high particle loadings of the clay particles used in the antiglare layer. This can be an advantage where higher particle loadings are desired for increased toughness of the particle containing layer is desired.

UV curable compositions useful for creating the antiglare layer of this invention may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri (meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth) acrylate.

Among others, in the present invention, conveniently used radiation curable lacquers include urethane (meth) acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968 from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio) phenyl]-2-morpholinopropanone-1.

The particles that provide antiglare properties are dispersed in the radiation curable antiglare, layer composition as described above and are layered clay particles. In addition the particles, typically exhibit specific surface area values ranging from $2–1000$ $m^2/g$.

Because of their irregular structure, such particles can allow the formation of a mechanical bond with the UV cured matrix. This prevents removal and dusting of the particles from the surface of the antiglare layer during abrasion of the surface resulting in increased surface haze. Spherical particles on the other hand are difficult to adhere to a surface layer and have a higher chance of being removed from the surface during handling resulting in pitting of the surface and resulting haze.

Examples of layered clay particles that provide the antiglare properties include layered crystalline materials that have an average particle size ranging from 2 to 20 micrometers, suitably from 2 to 15 micrometers and desirably from 4 to 10 micrometers. They are present in the layer in an amount of at least 2 wt percent and less than 50 percent, suitably from about 2 to 40 wt. percent, typically from 2 to 20 percent and desirably from 2 to 10 percent.

The layered materials most suitable for this invention include materials in the shape of plates with high aspect ratio, which is the ratio of a long direction to a short direction in an asymmetric particle. The preferred layered materials for use in the present invention include natural clays, especially natural smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include natural montmorillonite, hectorite and hydrotalcites, because of commercial availability of these materials.

The layered materials suitable for this invention may comprise phyllosilicates, for example, montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials may include illite, mixed layered illite/smectite minerals, such as ledikite and admixtures of illites with the layered materials named above. Other useful layered materials, particularly useful with anionic matrix polymers, may include the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Preferred layered materials are swellable so that other agents, usually organic ions or molecules, may splay, that is, intercalate and/or exfoliate, the layered material resulting in a desirable dispersion of the inorganic phase. These swellable layered materials include phyllosilicates of the 2:1 type, as defined in the literature (for example, "An introduction to clay colloid chemistry," by H. van Olphen, John Wiley & Sons Publishers). Typical phyllosilicates with ion exchange capacity of 50 to 300 milliequivalents per 100 grams are preferred. Generally, it is desirable to treat the selected clay material to separate the agglomerates of platelet particles to small crystals, also called tactoids, prior to introducing the platelet particles to the antiglare coating. Predispersing or separating the platelet particles also improves the binder/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations.

Examples of useful pretreatment with polymers and oligomers include those disclosed in U.S. Pat. Nos. 5,552,469 and 5,578,672, incorporated herein by reference. Examples of useful polymers for intercalating the platelet particles include polyvinyl pyrrolidone, polyvinyl alcohol, polyethylene glycol, polytetrahydrofuran, polystyrene, polycaprolactone, certain water dispersable polyesters, and polyamides.

Examples of useful pretreatment with organic reagents and monomers to produce organically modified clay, include those disclosed in EP 780,340 A1, incorporated herein by reference. Examples of useful organic reagents and monomers for intercalating the platelet particles include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatements disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Numerous methods to modify layered particles with organic cations are known, and any of these may be used in the process of this invention to provide organically modified clay. One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amount of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter. Useful organic cation salts for the process of this invention can be represented as follows:

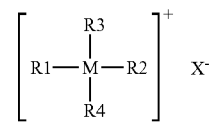

M represents either nitrogen or phosphorous; X- represents an anion selected from the group consisting of halogen, hydroxide, or acetate anions, preferably chloride and bromide; R1, R2, R3 and R4 are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, and polycaprolactone.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, or mixtures thereof, and alkyl phosphonium ions such as tetrabutyl phosphonium, trioctyl octadecyl phosphonium, tetraoctyl phosphonium, octadecyl triphenyl phosphonium, or mixtures thereof. Illustrative examples of suitable polyalkoxylated ammonium compounds include those available under the trade name Ethoquad or Ethomeen from Akzo Chemie America, namely, Ethoquad 18/25 which is octadecyl methyl bis(polyoxyethylene[15]) ammonium chloride and Ethomeen 18/25 which is octadecyl bis(polyoxyethylene[15])amine, wherein the numbers in brackets refer to the total number of ethylene oxide units. The most preferred organic cation is octadecyl methyl bis(polyoxyethylene{15}) ammonium chloride.

Examples of solvents employable for coating the antiglare layer of this invention include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion between the transparent plastic substrate film and the coating resin can be improved while minimizing migration of plasticizers and other addenda from the transparent plastic substrate film. Suitable solvents for supports such as TAC are aromatic hydrocarbon and ester solvents such as toluene and propyl acetate.

The coating composition may also include organic solvents, preferably the concentration of organic solvent is 1–99% percent by weight of the total coating composition.

The ultraviolet polymerizable monomers and oligomers containing these layered clay particles are applied to the transparent flexible support and subsequently exposed to UV radiation to form an optically clear cross-linked abrasion resistant layer. The preferred UV cure absorbance energy is between 30 and 1000 mJ/cm$^2$.

The thickness of the antiglare resistant layer is generally about 0.5 to 50 micrometers preferably 1 to 20 micrometers more preferably 2 to 10 micrometers.

The antiglare layer in accordance with this invention is particularly advantageous due to superior physical properties including excellent resistance to water permeability, fingerprinting, fading and yellowing, exceptional transparency and toughness necessary for providing resistance to scratches, abrasion and blocking.

The antiglare layer is preferably colorless. But it is specifically contemplated that this layer can have some color for the purposes of color correction, or for special effects, so long as it does not detrimentally affect the formation or viewing of the display through the overcoat. Thus, there can be incorporated into the polymer, dyes that will impart color. In addition, additives can be incorporated into the polymer that will give to the layer, desired properties. Other additional compounds may be added to the coating composition, depending on the functions of the particular layer, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The antiglare layer of the invention can be applied by any of a number of well known techniques, such as dip coating, rod coating, blade coating, air knife coating, gravure coating and reverse roll coating, slot coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published December 1989, pages 1007 to 1008.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers.

In order to reduce the sliding friction of the optical film in accordance with this invention, and to improve the scratch resistance of the coating, the UV cured polymers may contain fluorinated or siloxane-based components and the coating composition may also include lubricants or combinations of lubricants. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity of the UV cured antiglare layer a polymerizable lubricant such as Additive 31, a methacryloxy-functional silicone polyether copolymer (from Dow Corning Corp.) is preferred.

In order to successfully transport materials of the invention, the reduction of static caused by web transport through manufacturing is desirable. Since the antiglare layer of this invention can get charged from static discharge accumulated by the web as it moves over conveyance equipment such as rollers and drive nips, the reduction of static is necessary to avoid attracting dust and dirt. The transparent polymer support materials of this invention have a marked tendency to accumulate static charge as they contact machine components during transport. The use of an antistatic material to reduce the accumulated charge on the web materials of this invention is desirable.

Antistatic materials may be coated on the web materials of this invention and may contain any known materials in the art which can be coated on transparent web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating may be incorporated on either side of the support. The preferred surface resistivity of the antistat coat at 50% RH is less than $10^{13}$ ohm/square. Further, additional conductive layers also can be provided on the same side of the support as the antiglare layer(s) or on both sides of the support The support material for this invention can comprise various transparent polymeric films, such as films derived from triacetyl cellulose (TAC), polyethylene terephthalate (PET), diacetyl cellulose, acetate butyrate cellulose, acetate propionate cellulose, polyether sulfone, polyacrylic based resin (e.g., polymethyl methacrylate), polyurethane based resin, polyester, polycarbonate, aromatic polyamide, polyolefins (eg., polyethylene, polypropylene), polymers derived from vinyl chloride (e.g., polyvinyl chloride and vinyl chloride/vinyl acetate copolymer), polyvinyl alcohol, polysulfone, polyether, polynorbornene, polymethylpentene, polyether ketone, (meth)acrylonitrile, glass and the like. The films may vary in thickness from 1 to 50 mils or so.

Although it is desirable that the light transmissivity of these transparent substrates be as high as possible, the light transmissivity determined according to JIS K7105 & ASTM D-1003 using a BYK Gardner Haze-Gard Plus instrument should be at least 80 percent or, preferably at least 90 percent, or most preferably at least 93 percent. When the transparent substrate is used for an antiglare material mounted on a small and lightweight liquid crystal display device, the transparent substrate is preferably a plastic film. While it is a desirable condition that the thickness of the transparent substrate is as thin as possible from the standpoint of decreasing the overall weight, the thickness should be in the range from 1 to 50 mils in consideration of the productivity and other factors of the antiglare material Of the transparent support materials TAC, polycarbonate and polyester are preferred due to their overall durability and mechanical strength. Further, TAC is particularly preferable for a liquid crystal display device, since it has sufficiently low birefringence and makes it possible to laminate a non-glare film and a polarizing device to each other and furthermore can provide a display device of excellent display quality using the antiglare film.

The TAC film usable in the invention may be any one known in the art. The acetyl value of cellulose triacetate preferably is in the range of 35% to 70%, especially in the range of 55% to 65%. The weight average molecular weight of cellulose acetate preferably is in the range of 70,000 to 200,000, especially 80,000 to 190,000. The polydispersity index (weight average divided by number average molecular weight) of cellulose acetate is in the range of 2 to 7, especially 2.5 to 4. Cellulose acetate may be obtained from cellulose starting materials derived from either wood pulp or cotton linters. Cellulose acetate may be esterified using a fatty acid such as propionic acid or butyric acid so long as the acetyl value satisfies the desired range.

Cellulose acetate film generally contains a plasticizer. Examples of the plasticizers include phosphate esters such as triphenyl phosphate, biphenylyl diphenyl phosphate, tricresyl phosphate, cresyl diphenyl phosphate, octyl diphenyl phosphate, trioctyl phosphate, and tributyl phosphate; and phthalate esters such as diethyl phthalate, dimethoxyethyl phthalate, dimethyl phthalate, and dioctyl phthalate. Preferable examples of glycolic acid esters are triacetin, tributyrin, butyl phthalyl butyl glycolate, ethyl phthalyl ethyl glycolate, and methyl phthalyl ethyl glycolate. Two or more plasticizers shown above may be combined. The plasticizer is preferably contained in the film in an amount of not more than 20 weight %, especially of 5% to 15 weight %. Films prepared from polymers other than cellulose triacetate may also contain appropriately the above plasticizer.

The TAC of the invention may contain particles of an inorganic or organic compound to provide surface lubrication. Examples of the inorganic compound include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. Preferred are silicon dioxide, titanium dioxide, and zirconium oxide, and especially silicon dioxide. Examples of the organic compound (polymer) include silicone resin, fluororesin and acrylic resin. Preferred is acrylic resin.

The TAC film is preferably prepared by utilizing a solvent casting method. In more detail, the solvent casting method comprises the steps of: casting the polymer solution fed from a slit of a solution feeding device (die) on a support and drying the cast layer to form a film. In a large-scale production, the method can be conducted, for example, by the steps of casting a polymer solution (e.g., a dope of cellulose triacetate) on a continuously moving band conveyor (e.g., endless belt) or a continuously rotating drum, and then vaporizing the solvent of the cast layer.

Any support can be employed in the solvent casting method, so long as the support has the property that a film formed thereon can be peeled therefrom. Supports other than metal and glass plates (e.g., plastic film) are employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

A polymer employed in the solvent casting method is required to be capable of dissolving in a solvent. Further a film formed of the polymer is generally required to have high transparency and little optical anisotropy for application in optical products. Furthermore, the polymer preferably has compatibility with the absorbers. As the polymer employed in the solvent casting method, preferred is cellulose triacetate. However, other polymers can be employed so long as they satisfy the above conditions.

In the case of employing cellulose triacetate as the polymer, a mixed solvent of dichloromethane and methanol is generally employed. Other solvents such as isopropyl alcohol and n-butyl alcohol can be employed so long as cellulose triacetate is not precipitated (e.g., during the procedure of preparing the dope or adding the particles to the dope). A ratio of cellulose triacetate and solvent in the dope is preferably 10:90 to 30:70 by weight (cellulose triacetate: solvent).

Polycarbonate resin usable in the invention is preferably aromatic carbonates in terms of their chemical and physical properties, and in particular, bisphenol A type polycarbonate is preferred. Among them, bisphenol A type derivatives, in which a benzene ring, cyclohexane ring or aliphatic hydrocarbon group is introduced in the phenol A moiety, are more preferable. In particular is preferred a polycarbonate obtained by making use of the derivative in which at least one of these groups is introduced asymmetrically with respect to the central carbon atom. For example, a polycarbonate obtained by making use of a carbonate such that two methyl groups attached to the central carbon atom of bisphenol A are replaced by a phenyl group or a hydrogen atom of each benzene ring of bisphenol A is replaced by a substituent such as methyl or phenyl group, asymmetrically with respect to the central carbon atom is preferably used. Concretely are those obtained, through a phosgene method or transesterification method, from 4,4'-dihydroxy-diphenylalkane or its halogen substituted derivative, such as 4,4'-dihydroxy-diphenylmethane, 4,4'-dihydroxy-diphenylethane or 4,4,'-dihydroxy-diphenylbutane.

The polycarbonate resin may be used in the form of a mixture with other transparent resins such as polystyrene type resin, poly methyl methacrylate type resin or cellulose acetate type resin. At least one side of a cellulose acetate type film may be laminated with the polycarbonate resin. A method of preparing the polycarbonate type resin film usable in the invention is not specifically limited. Films prepared by any of the extrusion method, solvent-casting method and calendering method may be used. Either a uniaxially stretched film or a biaxially stretched film may be used. The solvent-casting film is preferred in view of superiority in surface fineness and optical isotropy.

The polycarbonate resin film used in the invention has a glass transition point of 110° C. or higher (preferably, 120° C. or higher) and water absorption of 0.3% or less (preferably, 0.2% or less), wherein the water content was measured after being dipped in water at 23° C. for 24 hrs.

Another preferable material is PET for the transparent support material from a viewpoint of thermal resistance, solvent resistance, machinability, mechanical strength and the like in case of coating the non glare layer by means of various kinds of coating methods. In a particularly preferred embodiment, the antiglare, coating of the invention is coated on at least one side of the transparent polymeric film described above. The antiglare film in such an embodiment may be advantageously employed as a protective film of a polarizing element, the polarizing element comprising a polarizing plate and the protective film provided on one side or both sides of the polarizing plate.

The invention extends to the use of the film of the invention in displays such as LCD displays and to touch screen displays. Polarizer elements can readily employ antiglare films of the invention, and it is apparent that the antiglare feature is important in touch screen displays.

A further aspect of this invention comprises an antiglare film having the proper balance of transmission haze, gloss and high transparency so as to be useful in a variety of applications, including high definition applications, where a gloss value of less than 130, a transmission of at least 90%, and a transmission haze value of less than 50 are required.

EXAMPLES

The following examples illustrate the preparation of the optical film in accordance with this invention.

Materials

A UV radiation curable urethane acrylate oligomer, CN 968, was obtained from Sartomer. The initiator, Irgacure907 was obtained from Ciba-Geigy. The cure lamp used was a D bulb from Fusion UV Systems, Inc. The polyamide particles, Orgasol 3501 EX D NAT 1 (P1, average particle size 10 micrometers) were obtained from ATOFINA Chemicals, Inc. The, layered clay particles, Claytone HT (P2, average particle size 4 um), were obtained from Southern Clay Products. All coatings were coated on 3.2 mil TAC.

Haze and Gloss Measurements

Haze was determined using a BYK Gardner Haze-Gard Plus instrument in accordance with ASTM D-1003 and JIS K-7105 methods. Gloss was determined (at 60 degrees) using a BYK Gardner micro Tri gloss meter in accordance with ASTM D523, ASTM D2457, ISO 2813 and JIS Z 8741 methods. The haze and gloss data in the above tables represent the average value taken from multiple readings made on each sample.

Examples 1–9

Antiglare Coating

The antiglare solution for comparative Example 1 was prepared by dissolving 10 grams of CN-968 into 10 grams of n-propyl acetate. To this solution, 0.2 gram of Orgasol 3501 EX D NAT 1 nylon beads was added and mixed throughly to form a dispersion. Finally, 0.2 gram of Irgacure 907 was dissolved in the dispersion. The solution was coated and dried on TAC and cured at 0.4 J/cm² to obtain an antiglare coating at a nominal dry coverage (1000 mg/ft²) 10.8 g/m². The remaining comparative examples were prepared similarly, but with appropriate formula modifications as indicated in Table 1.

The antiglare solution for inventive Example 6 was prepared by dissolving 24 g of the UV curable oligomer CN 968 in 10 grams of n-propyl acetate. To this solution, a dispersion was made by adding 1.2 g of clay particles, 7.3 g of toluene and 7.3 g of methanol. Finally, 0.5 g of Irgacure 907 was added and mixed throughly. The solution was coated and dried on TAC and cured at 0.4 J/cm² to obtain and antiglare coating at a nominal dry coverage (1000 mg/ft²) 10.8 g/m².

TABLE 1

| Examples | Particle Description (wt % wrt binder) | Avg. Haze | % Gloss |
| --- | --- | --- | --- |
| 1 | P1 (2) | 4.16 | 103.36 |
| 2 | P1 (4) | 9.05 | 70.46 |
| 3 | P1 (6) | 17.54 | 44.04 |
| 4 | P1 (8) | 18.36 | 43.50 |
| 5 | P1 (10) | 31.98 | 23.64 |
| 6 (Invention) | P2 (5) | 2.56 | 103.33 |
| 7 (Invention) | P2 (8) | 6.48 | 68.30 |
| 8 (Invention) | P2 (12) | 17.68 | 36.50 |
| 9 (Invention) | P2 (15) | 33.24 | 22.70 |

As Table 1 shows, the layered clay particles have an advantage over the comparative nylon particles in lowering the haze values at comparable gloss values. Comparing Example 1 with 6 and 2 with 7, it is clear that the layered clay particles do a better job of glare reduction without the same haze penalty.

The invention has been described in detail with particular reference to certain preferred embodiments thereof, but it will be understood that variations and modifications can be effected within the scope of the invention. The entire contents of the patents and other publications referred to in this specification are incorporated herein by reference.

What is claimed is:

1. An LCD display containing a transmissive optical film comprising a layer containing layered clay particles in a radiation cured binder wherein the total light transmission of the film is greater than 90 percent.

2. The LCD display containing a transmissive optical film of claim 1 wherein the radiation cured binder comprises polyfunctional acrylic compounds derived from polyhydric alcohols.

3. The LCD display containing a transmissive optical film of claim 2 wherein the radiation cured binder comprises a repeating group selected from the group consisting of ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, and neopentyl glycol di(meth)acrylate.

4. The LCD display containing a transmissive optical film of claim 2 wherein the radiation cured binder comprises a repeating group selected from the group consisting of pentaerythritol tetra(meth)acrylate and pentaerythritol tri(meth)acrylate.

5. The LCD display containing a transmissive optical film of claim 1 wherein the radiation cured binder comprises acrylate and methacrylate oligomers derived from the group consisting of low-molecular weight polyester resin, polyether resin, acrylic resin, epoxy resin, and polyurethane resin.

6. The LCD display containing a transmissive optical film of claim 1 wherein the radiation cured binder comprises a urethane acrylate compound.

7. The LCD display containing a transmissive optical film of claim 1 wherein the radiation cured binder comprises an aliphatic urethane acrylate derived from isophorone diisocyanate.

8. The LCD display containing a transmissive optical film of claim 1 wherein the radiation cured binder comprises a polyurethane acrylate derived from an aliphatic polyester polyol.

9. The LCD display containing a transmissive optical film of claim 1 wherein the particles comprise layered organically modified clay particles.

10. The LCD display containing a transmissive optical film of claim 1 wherein the particles have an average size of between 1 and 10 micrometers.

11. The LCD display containing a transmissive optical film of claim 1 wherein said particles are present in at least 2% by weight of the layer.

12. The LCD display containing a transmissive optical film of claim 1 wherein said particles are present in an amount of less than 50% by weight of the layer.

13. The LCD display containing a transmissive optical film of claim 1 wherein the amount of the clay is sufficient to provide a gloss less than 100.

14. The LCD display containing a transmissive optical film of claim 1 wherein the amount of the clay is sufficient to provide a gloss less than 80.

15. The LCD display containing a transmissive optical film of claim 1 wherein the amount of the clay is sufficient to provide a gloss less than 60.

16. The LCD display containing a transmissive optical film of claim 1 wherein the amount of the clay is sufficient to provide a haze less than 30.

17. The LCD display containing a transmissive optical film of claim 1 wherein the amount of the clay is sufficient to provide a haze less than 20.

18. The LCD display containing a transmissive optical film of claim 1 wherein the amount of the clay is sufficient to provide a haze less than 15.

19. The LCD display containing a transmissive optical film of claim 14 wherein the amount of the clay is sufficient to provide a haze less than 20.

20. The LCD display containing a transmissive optical film of claim 1 additionally containing a silicone acrylate lubricant.

21. The LCD display containing a transmissive optical film of claim 20 wherein the silicone acrylate lubricant is a methacryloxy-functional silicone polyether copolymer.

22. The LCD display containing a transmissive optical film of claim 1 wherein said film is deposed upon a transparent polymeric support.

23. The LCD display containing a transmissive optical film of claim 22 wherein said support is selected from the group consisting of triacetyl cellulose, polyethylene terephthalate, diacetyl cellulose, acetate butyrate cellulose, acetate propionate cellulose, polyether sulfone, polyacrylic based resins, polyurethane based resin, polyester, polycarbonate, aromatic polyamide, polyolefins, polymers derived from vinyl chloride, polyvinyl alcohol, polysulfone, polyether, polynorbornene, polymethylpentene, polyether ketone, and (meth)acrylonitrile.

24. The LCD display containing a transmissive optical film of claim 22 wherein said support is triacetyl cellulose.

25. The LCD display containing a transmissive optical film of claim 1 comprising a layer containing a radiation cured binder derived from a mixture of (meth)acrylate derivatives of pentaerythritol functionalized aliphatic urethanes.

26. The LCD display containing a transmissive optical film of claim 25 wherein the mixture comprises pentaerythritol tetra(meth)acrylate and pentaerythritol tri(meth)acrylate functionalized aliphatic urethanes.

27. The LCD display containing a transmissive optical film of claim 1 comprising a layer containing a radiation cured binder derived from isophorone diisocyanate.

28. A method of forming an optical film, comprising: providing a flexible transparent polymeric support, applying to the support a coating of radiation curable binder comprising polyfunctional acrylic compounds and layered clay particles in an organic solvent, and then radiation curing the said coating to form a layer wherein the coating additionally contains a silicone acrylate.

29. A method of forming an optical film, comprising: providing a flexible transparent polymeric support, applying to the support a coating of radiation curable binder comprising polyfunctional acrylic compounds and layered clay particles in an organic solvent, and then radiation curing the said coating to form a layer wherein the radiation curable binder comprises an aliphatic urethane acrylate derived from isophorone diisocyanate.

30. A method of forming an optical film, comprising: providing a flexible transparent polymeric support, applying to the support a coating of radiation curable binder comprising polyfunctional acrylic compounds and layered clay particles in an organic solvent, and then radiation curing the said coating to form a layer wherein the radiation curable binder comprises a polyurethane acrylate derived from an aliphatic polyester polyol.

* * * * *